United States Patent
Kokko (10) Patent No.: US 7,486,617 B2
(45) Date of Patent: Feb. 3, 2009

(54) NETWORK DEVICES AND TRAFFIC SHAPING METHODS

(75) Inventor: Timo Kokko, Kauniainen (FI)

(73) Assignee: Nokia Corporation, Espoo (FI)

( * ) Notice: Subject to any disclaimer, the term of this patent is extended or adjusted under 35 U.S.C. 154(b) by 657 days.

(21) Appl. No.: 11/089,134

(22) Filed: Mar. 24, 2005

(65) Prior Publication Data

US 2005/0276220 A1    Dec. 15, 2005

(30) Foreign Application Priority Data

Jun. 15, 2004   (FI)   .................................. 20045222

(51) Int. Cl.
*H04J 1/16*       (2006.01)
*H04J 3/14*       (2006.01)

(52) U.S. Cl. .................... 370/229; 370/230.1; 370/232; 370/395.4; 370/395.43

(58) Field of Classification Search ........................ None
See application file for complete search history.

(56) References Cited

U.S. PATENT DOCUMENTS

| | | | | |
|---|---|---|---|---|
| 5,936,958 | A * | 8/1999 | Soumiya et al. | 370/395.43 |
| 6,049,526 | A * | 4/2000 | Radhakrishnan et al. | 370/229 |
| 6,810,012 | B1 * | 10/2004 | Yin et al. | 370/230.1 |
| 2001/0036984 | A1 * | 11/2001 | Kuo et al. | 524/239 |
| 2001/0048690 | A1 * | 12/2001 | Magill et al. | 370/415 |
| 2002/0044563 | A1 * | 4/2002 | Magill et al. | 370/411 |
| 2002/0176358 | A1 | 11/2002 | Assa et al. | |
| 2003/0147399 | A1 | 8/2003 | Burns | |
| 2003/0231635 | A1 | 12/2003 | Kalkunte et al. | |
| 2004/0160961 | A1 * | 8/2004 | Duckering et al. | 370/395.4 |
| 2004/0257997 | A1 * | 12/2004 | Loewen et al. | 370/235 |
| 2007/0047586 | A1 * | 3/2007 | Tieman et al. | 370/486 |

OTHER PUBLICATIONS

Yang, J., "*Improving Service Rate Granularity By Dual-Rate Session Grouping In Cell-Based Schedulers*", IEEE vol. 4, 2001, pp. 2425-2429.

* cited by examiner

*Primary Examiner*—Ajit Patel
(74) *Attorney, Agent, or Firm*—Squire, Sanders & Dempsey L.L.P.

(57) ABSTRACT

In a network device of a broadband access device, granularity of queue rates is improved by introducing intermediate rates in addition to those conventionally provided. When an intermediate rate between a first 10 Mbps queue rate and a second 5 Mbps queue rate, for instance, is desired for a traffic flow, a skip interval in a traffic shaper is configured to calculate a skip interval value according to the 5 Mbps rate, while each PDU of the specific traffic flow is subjected to a further override-interval-calculation decision: with a 50% probability, for instance, a skip zero queue interval (used for the 10 Mbps rate) is applied to the PDU, instead of the skip interval value calculated for the PDU in the traffic shaper. As a result, an intermediate rate, such as 7.5 Mbps, is obtained. According to another aspect of the present invention, latency and timing problems are alleviated such that a PDU length is determined, and a queue interval is calculated and written to an interval register already for a first block of a PDU read from a queue.

24 Claims, 3 Drawing Sheets

NETWORK DEVICES AND TRAFFIC SHAPING METHODS

BACKGROUND OF THE INVENTION

The invention relates to broadband access systems and particularly to a network device for DSL (Digital Subscriber Line) access systems.

Currently, a primary broadband service to the homes is high-speed Internet access, which has turned the home computers into "always-on" home appliances. Public telephone networks usually utilize modems which transmit data at a rate of 56 kbps, for instance. In the telephone network the modems use the same frequency range as the telephones to transmit speech, the range being about 400 Hz to 4 kHz. However, the line between a switching center and a user, i.e. a subscriber line, allows frequencies much higher than 0 to 4 kHz to be used and thus more data to be transmitted. This limitation to 4 kHz is due to filters which are located in switching centers and filter additional frequencies from a signal supplied to the backbone network. Actually, in the subscriber line, typically made of a twisted copper pair, frequencies as high as several MHz can be transmitted.

DSL (Digital Subscriber Line) is a technology for bringing high-bandwidth information to e.g. homes and small businesses over ordinary copper telephone lines. Digital Subscriber Line is a technology that assumes that digital data requires no change into analogue form and back. Digital data is transmitted to a subscriber directly as digital data and this allows a much wider bandwidth to be used for transmitting the data than in traditional telephone systems. There are several DSL interfaces available, such as ADSL (Asymmetric DSL), SHDSL (Single-pair High-speed DSL), and VDSL (Very High data rate DSL).

Figure 1:
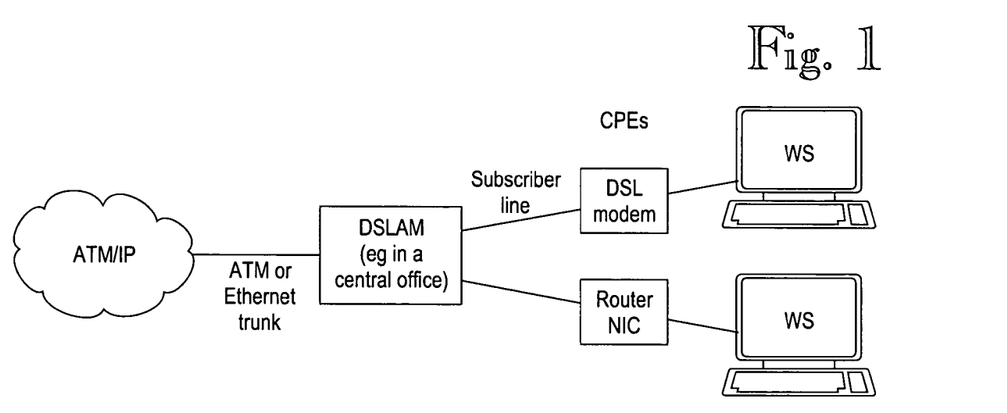
FIG. 1 illustrates an example of an xDSL system.

An example of an xDSL system is illustrated in FIG. 1. A subscriber's end-user equipment (such as a router, modem, or network interface card, NIC) 1 located at premises owned or controlled by a customer using network services is often referred to as customer premises equipment, CPE. On the network side, multiplexing equipment 2 that may contain a high concentration of central office splitters, xDSL modems, and other electronic equipment to connect traffic to a data network is often referred to as a digital subscriber line access multiplexer, DSLAM. A DSLAM delivers exceptionally high-speed data transmission over existing copper telephone lines and controls and routes the digital subscriber line (xDSL) traffic between the CPEs and the network service provider's network, such as an ATM/IP network.

One of the challenges to DSL operators is to select and deploy a correct deployment model for the broadband services. Currently, operators have selected different models: few of the operators use point-to-point protocol (PPP) over ATM, some use 1483 routed, and most of the operators use PPP over Ethernet or 1483 bridged. Operators have different criteria for selecting the deployment model. Their choice may be based for example on the number of public IP addresses needed, the price of the CPE or CPE installation and wholesale model. One of the key criteria today is the Layer 2 technology in use in the access network.

The standard specifies ATM to be used in the transport layer on top of the physical ADSL layer. If ATM is used also on the network side, the connections from DSL subscribers can easily be established and switched using ATM PVCs (Permanent Virtual Connections) and IP level intelligence is not required. An ATM access network basically supports all deployment models but introduces unnecessary overhead and is heavy to manage, whereas Ethernet based access networks cannot support deployment models where ATM is present. With Ethernet networks, the traditional ATM switching model needs to be replaced by packet switching, which can be carried out either on an Ethernet layer (layer 2) or an IP layer (layer 3), depending on the chosen deployment model.

Both access technologies have their limitations as well as advantages, and supporting all the possibilities creates more requirements for the DSLAMs. A DSLAM must support simultaneous feeds from ATM and IP interfaces, while it should at the same time provide the required service levels over both QoS (ATM) and CoS (IP) connections and flows simultaneously. ATM QoS (Quality of Service) enables service providers to fully utilize available bandwidth while managing multiple classes of service, such as Constant Bit Rate (CBR), Variable Bit Rate real-time (VBR-rt), and Variable Bit Rate non-real-time(VBR-nrt). IP CoS provides the rules as to how to manage IP flows. Typical IP Class of Services classes include Expedited Forwarding (EF), Assured Forwarding (AF), and Default Forwarding (DF).

Figure 2:
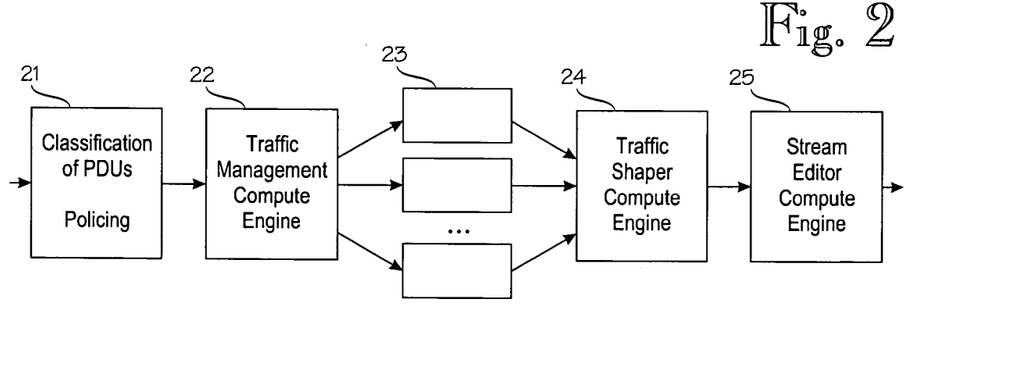
FIG. 2 illustrates one way to embody a DSLAM.

One approach to embody a DSLAM is illustrated in FIG. 2. As packets and cells ATM and IP traffic flows enter the DSLAM, they may pass through four major steps to ensure that they are handled appropriately relative to the type of information or services they are carrying: classification and marking, policing, queuing, and scheduling and shaping. These operations can be performed using a network processor that is able to provide wire-speed performance with a flexible programming environment and simultaneously support many different communication protocols. One such processor is a PayloadPlus traffic management network processor from Agere Systems. In a DSLAM application, the network processor can be configured to function as a centralized switch and can feed multiple DSL line cards, each with many ports. The internal logic provides high-level control of network processor scheduling functions, i.e. traffic manager (TM) and traffic shaper (TS) compute engine (CE). A TM compute engine (CE) in a network processor offers fully programmable traffic management capabilities, including buffer management policies, through a reduced and optimized C instruction set. To enforce a buffer management policy, a short script is executed on the buffer management-processing engine. The traffic management script determines whether or not to discard or allow traffic to be scheduled. This decision is based on the user programmed discard policy. In addition, a network processor has the facilities to schedule cell and frame-based traffic using a number of scheduling algorithms. The processor's configuration, the traffic shaper (TS) compute engine (CE), and the programmable queue definitions define the traffic shaping. For example, the traditional ATM constant bitrate (CBR), variable bitrate (VBR) and unspecified bitrate (UBR) schedulers are programmable in the network processor. The traffic shaper compute engine executes a program defined at every scheduling event. The traffic shaper may also be used to support class of service queue selection for frame-based traffic using algorithms such as weighted round robin; variable-bitrate cell-based traffic scheduling using dual leaky bucket algorithms; and frame-based, smoothed, deficit-weighted, round robin scheduling by tracking rate credits for each queue.

There may be several queues and traffic shaping schedulers for each logical output port (mapped to an xDSL port, for example) in a traffic shaper computer engine. The transmission of cells or blocks from the queues to the logical output port is scheduled based on a so-called main scheduling time wheel principle. The logical output port has a predetermined port rate, e.g. 10 Mbps. QoS (ATM) and/or CoS (IP) connections and flows share the port rate. For this purpose, a queue interval is dynamically determined for each queue. The queue interval defines the number of main scheduling time slot to be skipped before a next block or cell is transmitted from a specific queue. If the number of time slots to be skipped is zero, also the next block is transmitted from the same queue unless the queue is empty. This means that the queue rate is 10 Mbps. If the number of time slots to be skipped is 1, the traffic shaper CE next transmits from another queue having the next highest priority, before transmitting again from the first queue. This means that the queue rate is 5 Mbps. Similarly, when the number of time slots to be skipped is 2 or 3, a queue rate of 3.33 Mbps or 2.5 Mbps, respectively, is obtained.

A problem with this approach is inadequate granularity in QoS provisioning when using generic QoS/CoS traffic shaping: For a 10 Mbps port we only get 10, 5, 3.3, 2.5, 2, 1.7, 1.3 and 1 Mbps as queue rates. Also, there may easily be significant latency in the scheduling parameters sinking in, so the QoS provisioning is not very precise. Still further, ingenious scripting is required to facilitate a mix of ATM and packet data traffic, due to a very limited scripting interface. The traffic schedulers are controlled via programmable scripts that are executed for each block. In the Agere's network processor, this means that the script must be executed within 22 clock cycles (RSP global pulse) which severely limits the complexity that can be imposed in the algorithms.

BRIEF DESCRIPTION OF THE INVENTION

An object of the invention is an enhanced scheduling and traffic shaping that alleviates or overcomes at least one of the above problems.

Main aspects of the present invention are disclosed in the attached independent claims. Further embodiments of the invention are disclosed in the dependent claims.

According to an aspect of the present invention, granularity of queue rates is improved by introducing intermediate rates in addition to those conventionally provided. When an intermediate rate between a relatively higher first qeue rate (e.g. 10 Mbps) and a second lower queue rate (e.g. 5 Mbps) is desired for a traffic flow, a skip interval in the traffic shaper is configured to calculate a skip interval value according to the second lower rate (e.g. 5 Mbps). This would conventionally result in a queue rate equal to the second rate (5 Mbps). However, according to an embodiment of the invention, each PDU of the specific traffic flow is subjected to a further override-interval-calculation decision: with a preset probability, preferably approximately 50%, a skip zero queue interval is applied to the PDU, instead of the skip interval value calculated for the PDU in the traffic shaper.

According to another aspect of the present invention, latency and timing problems encoutered in the prior art are alleviated so that a PDU length is determined (in terms of the number of blocks), and a queue interval is calculated and written in an interval register already for a first block of a PDU read from a queue. As a consequence, the interval setting in the register takes effect (after an inherent latency time) before the last block of the PDU is read from the queue and sent.

These aspects are applicable both to QoS traffic and CoS traffic, allowing five different ATM QoS traffic types and three different packet CoS traffic types per port to be prioritized and scheduled, all simultaneously.

BRIEF DESCRIPTION OF THE DRAWINGS

In the following, the invention will be described in greater detail in connection with preferred embodiments and with reference to the accompanying drawings, in which.

DETAILED DESCRIPTION OF THE INVENTION

Even though the use of the invention will be described below in connection with a DSL access system, this does not restrict the application of the invention in other access and communications systems.

The functional blocks shown in FIG. 2 can be distributed between different parts of a network processor in many alternative ways. For example, Agere Payload Plus Network processor contains three main units, a Fast Pattern Processor (FPP), Agere System Interface (ASI), and a Routing Switch Prosessor (RSP). Classification, marking and policing 21 may be located in the FPP and/or ASI, and traffic management 22, queues 23, traffic shaping 24, and stream editing 25 may be located in the RSP, for example.

In general, classification identifies a PDU, policing ensures conformance, and scheduling provides appropriate servicing of the queues so that traffic can be presented into the network in an appropriate manner, with respect to class priorities. Since ATM as a connection-based protocol differs from packet based protocols, such as IP, the traffic management is also different, depending on the protocol. With ATM QoS, strict performance values can be guaranteed whereas IP CoS allows only specification of relative priority of a packet. It has no provisions to specify a different drop precedence for packets of a certain priority.

A preferred embodiment of the invention supports four ATM Quality of Service classes (that is, CBR, rt-VBR, nrt-VBR, and UBR) and three IP Class of Services classes (that is, EF, AF and DF). For example, services requiring CBR in ATM would require EF if it is an IP flow. In preferred embodiments of the invention, traffic is treated with respect to traffic parameters and priority levels regardless of whether the traffic is ATM or IP, thus trying to provide the same level of Quality of Service regardless of the protocol.

Traffic policing means that active processes monitor and enforce rules embodied in a traffic contract. A policing process may be implemented in the same manner for both ATM and IP traffic. Incoming packets are marked with an identifier describing the rate and priority. Traffic policing ensures that traffic submitted to a network does not exceed the traffic descriptors set for the connection. Traffic policing marks PDUs for internal use based, for example, either on the Generic Cell Rate Algorithm (GCRA) for cells or TrTCM for packets.

In the traffic management compute engine 22, the PDUs are either queued or discarded based on policing results (marking) and the degree of fullness of the destination queue. If a PDU is not discarded, the PDU is added to an appropriate queue 23 for scheduling. The appropriate queue 23 is determined based on information obtained from the classification and policing stages 21. The queues 23 are programmed to process PDUs in different ways, i.e. to embody different quality of service (QoS) and class of service (CoS) queues.

Figure 3:
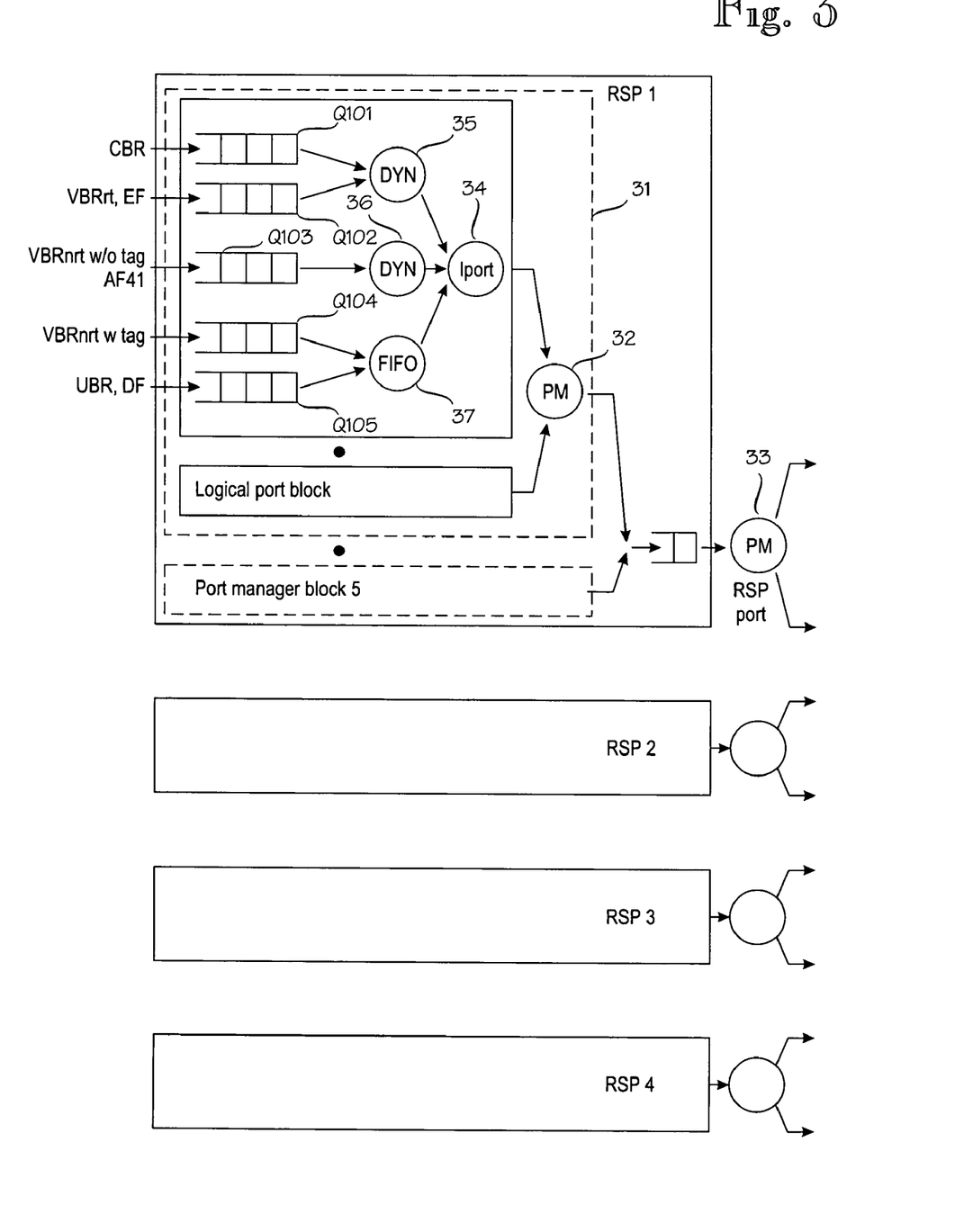
FIG. 3 illustrates an example of scheduling components of a routing switch processor RSP according to an embodiment of the present invention.

FIG. 3 illustrates an example of scheduling components of a routing switch processor RSP according to an embodiment of the present invention. An RSP output port 33 is the physical interface for transmitting traffic. The RSP output port 33 may be, for example, an xDSL interface to a subscriber connection. A port manager (PM) 32 defines a rate for one or more logical ports 34. In the example of FIG. 3, there are five port managers 32 and respective port manager blocks in each RSP unit RSP1 to 4. A logical port 34 defines a connection for an individual traffic flow. Each logical port 34 is configured with a table of schedulers. Each scheduler 35, 36 and 37 supports specific type(s) of traffic. In FIG. 3, three schedulers are configured: a first dynamic scheduler 35, a second dynamic scheduler 36, and a first-in-first-out (FIFO) scheduler 37. Each scheduler maintains a table of queues. For the first and second dynamic (e.g. VBR) schedulers 35 and 36, and also for the FIFO scheduler 37, the table of queues may be a time-slot table for assigning time-slots to queues. The first and second dynamic schedulers 35 and 36 assign time-slots dynamically based on script programming of the traffic shaper compute engine 24 that can include traffic characteristics and the state of the RSP. Traffic that does not require shaping, such as UBR traffic, is scheduled using the FIFO scheduler 37.

In the example of FIG. 3, five queues are configured for QoS and CoS type data flows. The first queue with the queue ID QID1 is configured for CBR traffic flows. The second queue QID2 is configured for VBRrt and EF traffic flows. The third queue QID3 is configured for VBRnrt with w/o tag traffic flows and AF41 traffic flows. The fourth queue QID4 is configured for VBRnrt w tag traffic flows. The fifth queue QID4 is configured for UBR and DF traffic flows.

The queues QID1 and QID2 are assigned to the first dynamic scheduler 35, the queue QID3 is assigned to the second dynamic scheduler 36, and the queues QID4 and QID5 are assigned to the FIFO scheduler 37.

In the examples described herein, the basic function of dynamic scheduling is performed via Queue—64/48 byte Data Block-Time Slot Table-Queue Interval elements, and by a main scheduling time wheel. One data block of 64 or 48 bytes can be transmitted in one time slot to the logical port. Thus, the PDUs in the queues are scheduled in blocks of 64 or 48 bytes. A global rate clock fires each time the RSP is ready to transmit another block, i.e. it defines the time-slot configuration. Each time the RSP is ready to send a block of data, the scheduling process begins with the selection of a port manager 32, followed by the selection of a logical port 34. Next, the selection of a scheduler 35, 36 or 37 is performed. Typically, the schedulers have a priority order in which they are selected. In the example described herein, the first dynamic scheduler 35 has the highest priority and the FIFO scheduler 37 the lowest priority. Finally, the schedulers 35 to 37 have time-slot tables which define how the time-slots are assigned to the queues of the respective scheduler.

A queue interval is dynamically determined for each queue. The queue interval defines the number of main scheduling time slots to be skipped before a next block or cell is transmitted from a specific queue. Thus, the interval has relation to a data rate of the queue. An interval value zero means that the number of time slots to be skipped is zero, and also in the next time slot a block is transmitted from the same queue unless the queue is empty. This results in a 100% bandwidth related to the logical port rate if a PDU size is one block or less. Similarly, an interval value one means skipping one time slot, the traffic shaper CE 24 next transmitting from another queue having the next highest priority, before transmitting again from the first queue. This results in a 50% rate of the port rate. In principle, the rate corresponds to the base formula $y=\frac{1}{2}^X$, where y is the rate and x is the interval value. Lets assume that the port rate is 10 Mbps. The interval values 0, 1, 2, 3, 4, 5, 6, 7, 8 and 9 would then result in queue rates 10 Mbps, 5 Mbps, 3.33 Mbps, 2.5 Mbps, 2 Mbps, 1.7 Mbps, 1.3 Mbps, 1.1 Mbps, and 1 Mbps, respectively. This granularity does not allow very accurate rate adjusting for a queue, especially at higher rates versus the port rate.

The traffic manager TM and the traffic shaper TS are controlled via programmable scripts that are executed for each PDU in the case of a TM, and for each block in the case of a TS. Only one script can be used per one scheduler. If the scheduler must process ATM QoS traffic and packet CoS traffic simultaneously, a new kind of script and shaping method is needed. The conventional separate ATM and packet traffic shaping scripts are not applicable to this purpose.

In accordance with an embodiment of the present invention, granularity of the queue rate is improved by introducing intermediate rates in addition to those conventionally provided. When an intermediate rate between a relatively higher first queue rate R1 (e.g. 10 Mbps) and a second lower queue rate R1/N (e.g. 5 Mbps) is desired for a traffic flow, a skip interval in the traffic shaper is configured to calculate the skip interval value according to the second lower rate (e.g. 5 Mbps). This would conventionally result in a queue rate equal to the second rate (5 Mbps). However, according to an embodiment of the invention, each PDU of the specific traffic flow is subjected to a further override-interval-calculation decision: with a preset probability, preferably approximately 50% probability, the PDU is marked to receive a skip zero scheduling, instead of the skip interval value calculated in the traffic shaper. In other words, with the propability of 50%, the traffic shaping scheduler uses the interval value zero for a PDU instead of the calculated interval value. Statistically, this has the effect of adding an intermediate queue bit rate value between the first and second queue rates. If the first and second queue rates are 10 Mbps and 5 Mbps, the intermediate queue rate obtained is approximately 7.5 Mbps in average when a probability of approximately 50% is used. Similarly, an intermediate queue rate can be provided between any two conventional queue rates.

In a preferred embodiment, the PDU is marked for the override-interval calculation decision in the classification or policing stage or in the traffic management compute engine. This is advantageous since the operation has to be carried out only once for each PDU. The result of the override-interval calculation decision is delivered to the traffic shaper with a specific interval override flag which can be formed by any parameter, bit(s), byte(s), or any other suitable data structure. The override-interval flag may adopt a first state, such as TRUE or 1, and a second state, such as FALSE or 0. Any suitable random algorithm can be used for setting the flag so that both states appear with the same propability. An example of a Traffic Manager script including instructions for providing a random 0/1 flag bit for the traffic shaper is shown in Annex 1.

Figure 4:
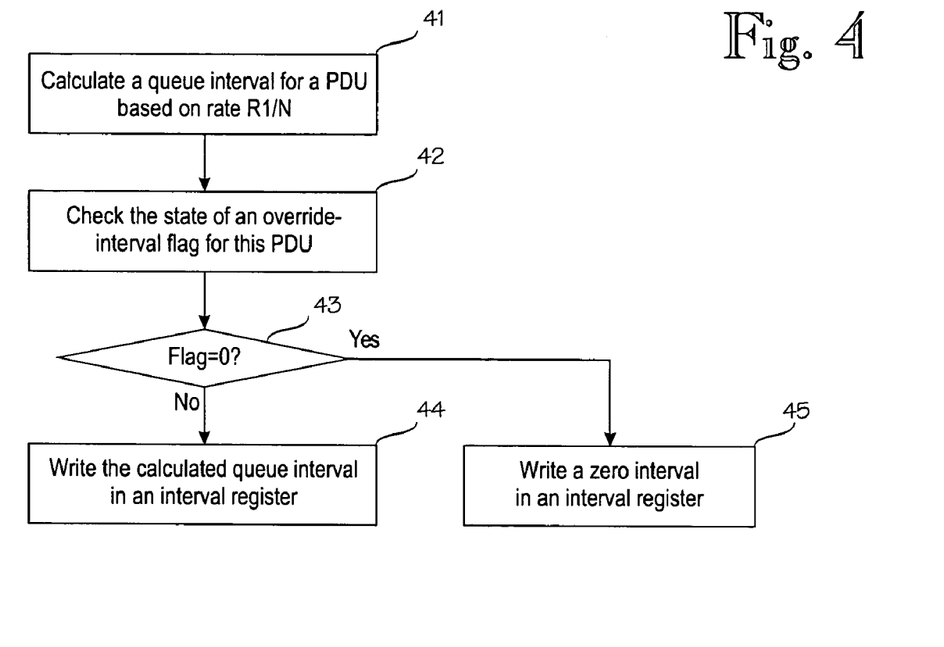
FIG. 4 is a flow diagram illustrating an aspect of the invention.

The traffic shaper may calculate the queue interval for the PDU conventionally or in accordance with the new inventive concept described below (step 41 in FIG. 4). Regardless of how the interval is calculated, the traffic shaper checks the state of the interval-override flag (steps 42 and 43). If the state is FALSE/0, the traffic shaper writes the zero skip interval value to an interval register (step 45). If the state is TRUE/1, the traffic shaper writes the calculated interval value to the interval register (step 44). An example of a Traffic Shaper script including instructions for checking a random 0/1 flag bit and writing the interval register accordingly is shown in Annex 2. As a result, we get a 75% effective bandwidth due to the existence of interval "0.5" (50% for 0 and 1 each). If another probability is used instead of 50%, the effective bandwidth changes accordingly.

In the prior art, a queue interval is calculated and written to an interval register only after all blocks of a PDU are read from a queue and counted. There is an inherent latency time of duration of four blocks before a new setting of the interval register takes effect. Thus, it is possible that four blocks from a next PDU in the queue are read and sent after the actual PDU. This undesired event distorts the timing of the traffic shaper compute engine, thereby affecting other queues of the same logical port.

Figure 5:
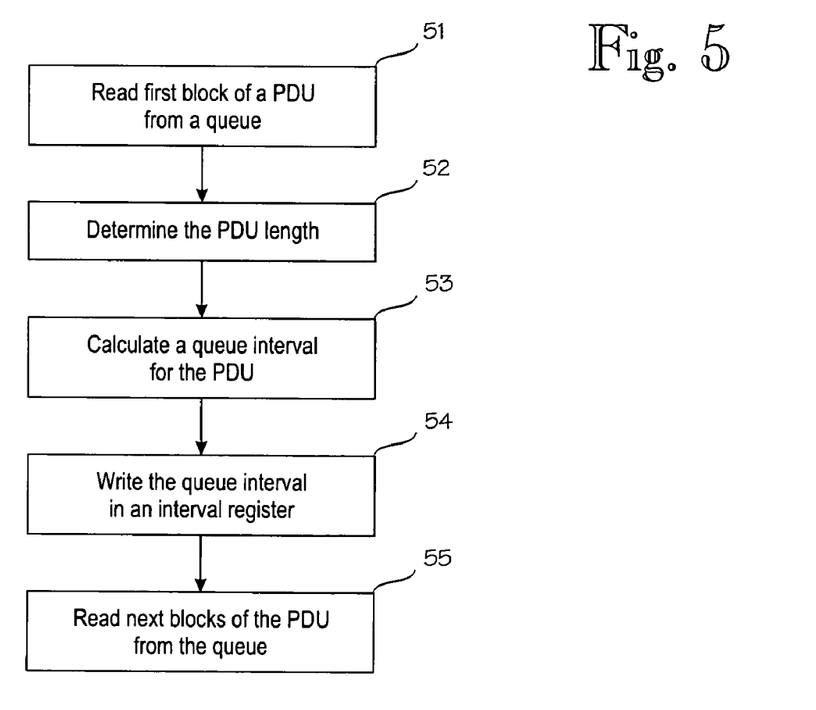
FIG. 5 is a flow diagram illustrating a further aspect of the invention.

According to a further aspect of the invention, these problems with the prior art are alleviated so that a PDU length is determined (in terms of the number of blocks) (step 52 in FIG. 5), and a queue interval is calculated (step 53) and written to an interval register (step 54) already for the first block of a PDU read from a queue (step 51). The next blocks are read from the queue (step 55). As a consequence, the interval setting in the register takes effect (after the four block latency time) before the last block of the PDU is read from the queue and sent. The PDU length may be read from a TS register provided by CE hardware.

In an embodiment applying this further aspect of the invention, a base interval is first calculated by software using double math, based on provisioned effective bandwidth for the queue vs. port rate. The base interval is multiplied by 64 in order to allow more accuracy in any further (integer) calculations. The value 64 is selected because it corresponds to a bit operation "left shift 6", and the bit shifting is the only feasible way to do maths in traffic shaper TS scripts. The base interval is then given as a TS parameter for the queue, to be read every time a TS script is executed (i.e. for each 64 byte block).

The traffic shaping and the interval calculation preferably take into account also the PDU length that is being scheduled. In an embodiment of the present invention, this is implemented in a TS script so that a PDU size changes the result of the interval multiplication by a corresponding left shift count (ie. lengthInterval=baseInterval*$2^{pduLengthShiftLeft}$). The PDU length may be read from a TS register provided by CE hardware. Thus, the PDU size affects the number of left shifts in the following way:

| PDU size | left shift |
|---|---|
| <=64 | 0 |
| 513-102 | 1 |
| 513-103 | 2 |
| 513-104 | 3 |
| 513-105 | 4 |
| 1025> | 5 |

The actual interval value is calculated by dividing the length interval by 64, i.e. via bit operation "right shift 6", thus removing the original 64 multiplication carried out for the base interval by software. This interval value can be written to the interval register as described above. An example of a TS script implementing these steps is illustrated in Annex 2.

This further aspect of the invention greatly smoothens the effect of different PDU sizes on data flows in other queues, and as related matter, reduces the effect of four or so block time latencies related to the interval register handling in the RSP scheduling mechanism.

Also in association with the further aspect of the invention, an intermediate rate can be achieved by randomly replacing the calculated interval value with a zero skip interval value, as described above with respect to the first aspect of the invention. Thus, after the length interval has been divided by 64, and before writing the interval to the TS register, it is checked whether the calculated interval value or zero is written. This may be determined by a specific bit or flag delivered to the TS from the TM for all blocks in that particular PDU. As described above, the TM uses a random function for the bit calculation; the bit is set with a 50% probability. An example of a TS script implementing these steps is illustrated in Annex 2.

It is obvious to a person skilled in the art that as technology progresses, the basic idea of the invention can be implemented in a variety of ways. Thus the invention and its embodiments are not restricted to the above-described examples but they may vary within the scope of the claims.

ANNEX 1

```
/****************************************************
*********
*TM script for Agere
****************************************************
*********/
// Include files
#include "tm.h"
#pragma multiplySupport
/* Configurable parameters for drop precedence 0 */
// Minimum threshold to start discard
unsigned prm_Q_thresh_min0      param_block_in[0:1];
// Maximum buffer threshold after which all PDUs are discarded
unsigned prm_Q_thresh_max0      param_block_in [2:3];
// EFCI threshold for the queue. Note that this does not separate
// ATM and packet traffic unless that will be indicated by FPP.
unsigned prm_Q_thresh_efci           param_block_in[6:7]; //
                                     old name
Width used in some context.
/* Statistics */
unsigned prm_stat_pdu_passed     param_block_inout[2:3];
unsigned prm_stat_pdu_drop       param_block_inout[6:7];
// Store the temporary block in queue
unsigned(2) new_blocks_in_Q;
/****************************************************
Parameter flag bit defs:
parameters
7       unused
6       TM to TS: random 1/0
5       FPP to TM: policing Discard
4       FPP to TM: policing Tag
3       FPP to SED: NAT cell header PT1
2       FPP to SED: NAT cell header PT2 EFCI
1       FPP to SED: NAT cell header PT3 (AAL5 last cell)
0       FPP to SED: NAT cell header CLP
parameters_tm (FPP fTransmit Extended Flags)
7       unused
6       unused
5       unused
4       unused
3       unused
2       FPP to TM: Multicast
1       FPP to TM: RSP ID MSB
0       FPP to TM: RSP ID LSB
****************************************************/
script tm_rsp_0
{
        // Check RSP ID; if not corresponding to this one, drop the
PDU, unless multicast PDU.
                if( ((parameters_tm & 0x03) != 0) && // set the comparison
value according to RSP this script is meant for
                        ((parameters tm & 0x04) == 0) )
                {
                        drop = true;
                }
                // Check Policing Bits
                if ( (parameters & 0x20) != 0 ) // Drop bit set by
FPP/policing.
                {
                        drop = true;
                }
```

-continued

```
        // Just a sanity check for development phase; if # of blocks
stored in RSP mem > total mem/2, drop.
            if (used_mem > 32000)
            {
                drop = true;
            }
            // CLP and EFCI marking, used by SED script. First zero out the
PT2 (congestion)
            // bit in flags. Do not touch PT1 nor PT3 since they are
delivered as is in ATM
            // connection case. This concerns also CLP, unless specifically
requested for marking
            // by policing.
            parameters = parameters & 0x3b;
            if ( (parameters & 0x10) != 0 ) // Tag bit set by FPP/policing.
            {
                parameters = parameters | 0x01;
            }
            new_blocks_in_Q = blocks_in_Q + pdu_blocks;
            if ( (prm_Q_thresh_efci != 0) && (new_blocks_in_Q >=
prm_Q_thresh_efci) )
            {
                parameters = parameters | 0x04; // Set EFCI bit.
            }
// set second bit with 50% probability. The bit can be used by
Traffic Shaper script.
            parameters = parameters | (random[1] & 0x40);
            if( (new_blocks_in_Q > prm_Q_thresh_min0) &&
                (((random[1] & 0x01) != 0) || ((parameters & 0x10) != 0))
)
            { // Drop CLP tagged, 50% chance for dropping for the rest
                drop = true;
            }
            if (new_blocks_in_Q >= prm_Q_thresh_max0) // Buffer
            reserved
for the queue used up completely.
            {
                drop = true;
            }
}
```

ANNEX 2

```
/**********************************************
 * Script for calculating Interval value for a PDU or ATM cell.
 /**********************************************/
#include "ts.h"
// #pragma multiplySupport // 1.0 Asic should support * operator
unsigned        prm_interval        param_block[0:1];
unsigned        curr_interval       param_block_inout[0:1];
unsigned(4)     tmp_interval;
unsigned(1) pduLengthShift;
unsigned(1) intervalAdjust;
script new_interval
{
//intervalAdjust = 1;
// Since multiplying still does not work, we must increase the
// PDU size granularity in calculation and use bit shifting.
if(pdu_length > 32)
        pduLengthShift = 1;
//if(pdu_length > 128)
        //pduLengthShift = 1;
if(pdu_length > 256)
        pduLengthShift = 2;
if(pdu_length > 512)
{
        pduLengthShift = 3;
}
if(pdu_length > 1024)
        pduLengthShift = 4;
// The equation is
// ((prm_interval - 64) * ((pduSizeInBytes + 12) / 64) / 64) + 2,
// where 2 is the Agere interval for max rate, 12 is ATM cell to block
```

-continued

```
// adjustment, and prm_interval is precalculated by CPU as
// 64 * portRate / newRate.
//
// Factor 64 or 32 is used (e.g. instead of 100) since it can be neatly
// utilized via 6 or 5 bit shifting once increasing the calculation
// integer accuracy, and bytes-to-blocks division can be done
// the same way by adding another 6 bit right shift.
//
// E.g if port rate is 8 megs and needed bandwidth is 8 megs,
// and PDU size is 1500 bytes (23 64-byte blocks), we get
// prm_interval 64 * 8000000/8000000 = 64 =>
// ((64 - 64) * (1512 / 64) / 64) + 2 = 2.
//
// If the wanted rate is 50%, 4 megs, we get prm_interval 128, and
hence
// ((128 - 64) * (1512 / 64) / 64) + 2 = 23 + 2 = 25, ie. 23 blocks
are
// transmitted, and then RSP leaves 25 - 2 = 23 gaps.
//
// tmp_interval = (prm_interval - 64) * (pdu_length + 12);
tmp_interval = prm_interval << pduLengthShift;
tmp_interval = (tmp_interval >> 6) & 0xffff;
if((parameters & 0x40) != 0) // bit delivered from TM with 50%
probability for each
PDU/cell.
    {
        pdu_interval = 0;
    }
    else
    {
        pdu_interval = tmp_interval;
    }
// For debug:
// curr_interval = pdu_interval;
upd_interval = true;
```

The invention claimed is:

1. A method comprising:

buffering data blocks of packet data units (PDUs) of a traffic flow in a queue for subsequent transmission to a logical output port having a port rate R1;

reading the data blocks of a packet data unit from said queue to a scheduler;

calculating a queue interval for the data blocks of said packet data unit based on a rate R1/N and a length of said packet data unit, wherein N is an integer greater than 1, said queue interval representing a number of time slots to be skipped before next reading data blocks from the queue after the present packet data unit; and randomly overriding said calculated queue interval with one of a predetermined shorter and a zero queue interval with a preset probability, to provide an effective intermediate queue rate between rate R1 and R1/N.

2. The method according to claim 1, comprising:

generating an override-interval flag for said packet data unit in one of a preceding classification, a marking, a policing and a traffic managing stage of a network processor, said override-interval flag adopting a first state randomly with a probability of 50%;

delivering the override-interval flag to the scheduler;

wherein said randomly overriding comprises checking the override-interval flag in the scheduler, overriding said calculated queue interval with one of said predetermined shorter and said zero queue interval if the override-interval flag is in the first state, and otherwise using the calculated queue interval.

3. The method according to claim 1, wherein R1=10 mega bits per second (Mbps), N=2, R1/N=5 Mbps, and the effective intermediate queue rate is approximately 7.5 Mbps.

4. A method comprising:
buffering data blocks of packet data units (PDUs) of a traffic flow in a queue for subsequent transmission to a logical output port having a port rate R1;
reading a first data block of a packet data unit from said queue to a scheduler;
determining a length of the packet data unit and calculating a queue interval for said first data block of said packet data unit based on a rate R1/N and the length of said packet data unit, wherein N is an integer greater than 1, said queue interval representing a number of time slots to be skipped before next reading data blocks from the queue after the present packet data unit;
randomly overriding said calculated queue interval with one of a predetermined shorter and a zero queue interval with a preset probability, to provide an effective intermediate queue rate between rate R1 and R1/N; and
reading subsequent data blocks of said packet data unit from the queue.

5. A method comprising:
buffering data blocks of packet data units (PDUs) of at least two traffic flows in at least two queues for subsequent transmission to a logical output port having a port rate R1;
assigning at least two dynamic schedulers for said logical output port;
selecting, when ready to send another data block to said output port, one of said at least two dynamic schedulers having a highest priority and traffic to transmit;
selecting a next queue to be serviced from among the selected scheduler's set of queues;
reading a first data block from a next packet data unit waiting in said selected queue to the selected scheduler;
determining a length of the next packet data unit and calculating a queue interval for said first data block of said packet data unit based on a rate R1/N and the determined length of said packet data unit, wherein N is an integer greater than 1, said queue interval representing the number of time slots to be skipped before next reading data blocks from a same queue after a present packet data unit;
randomly overriding said calculated queue interval with one of a predetermined shorter and a zero queue interval with a preset probability, to provide an effective intermediate queue rate between rate R1 and R1/N; and
reading subsequent data blocks of said packet data unit from the selected queue.

6. An apparatus comprising:
a buffering unit configured to buffer data blocks of packet data units (PDUs) of a traffic flow in a queue for subsequent transmission to a logical output port having a port rate R1;
a reader configured to read the data blocks of a packet data unit from said queue to a scheduler;
a calculator configured to calculate a queue interval for said data blocks of said packet data unit based on a rate R1/N and a length of said packet data unit, wherein N is an integer greater than 1, said queue interval representing a number of time slots to be skipped before next reading the data blocks from a same queue after a present packet data unit;
an overriding unit configured to randomly override said calculated queue interval with one of a predetermined shorter and a zero queue interval with a preset Probability to Provide an effective intermediate queue rate between rate R1 and R1/N.

7. The apparatus according to claim 6, comprising:
a generator configured to generate an override-interval flag for said packet data unit in one of a preceding classification, a marking, a policing and a traffic managing stage of a network processor, said override-interval flag adopting a first state randomly with a preset probability;
a delivering unit configured to deliver the override-interval flag to the scheduler;
said overriding unit further comprising a checking unit configured to check the override-interval flag in the scheduler, wherein the overriding unit is configured to override said calculated queue interval with said one of predetermined shorter and zero queue interval if the override-interval flag is in the first state, and otherwise the overriding unit is configured to use the calculated queue interval.

8. The apparatus according to claim 6, wherein R1=10 Mbps, N=2, R1/N=5 Mbps, and the effective intermediate queue rate is approximately 7.5 Mbps.

9. The apparatus according to claim 6, further comprising:
at least two queue buffers configured to buffer data blocks of packet data units (PDUs) of at least two traffic flows in at least two queues for subsequent transmission to a logical output port having a port rate R1;
at least two schedulers, at least one of the at least two queues being assigned to each scheduler;
a main scheduling control configured to select, when ready to send another data block to said logical output port, one of said at least two schedulers having a highest priority and traffic to transmit;
the selected scheduler being configured to select a next queue to be serviced from among said at least one of the at least two queues assigned to the scheduler, and read data blocks of a next packet data unit waiting in said selected next queue.

10. The apparatus according to claim 9, comprising:
a first queue configured for first Quality of Service (QoS) type traffic;
a second queue configured for second QoS type traffic and first Class of Service (CoS) type traffic;
a third queue configured for third QoS type traffic and second CoS type traffic;
a fourth queue configured for fourth QoS type traffic;
a fifth queue configured for fifth QoS type traffic and third CoS type traffic;
a first dynamic scheduler configured for the first and second queues;
a second dynamic scheduler configured for the third queue; and
a first-in-first-out (FIFO) scheduler configured for the fourth and fifth queues.

11. The apparatus according to claim 10, wherein: the first QoS type traffic includes Constant Bit Rate (CBR) type traffic;
the second QoS type traffic includes Variable Bit Rate real-time (VBR-nrt) type traffic;
the third QoS type traffic includes Variable Bit Rate non-real-time (VBR-nrt) without tag type traffic;
the fourth QoS type traffic includes Variable Bit Rate non-real-time (VBR-nrt) with tag type traffic; and
the fifth QoS type traffic includes Unspecified Bit Rate (UBR) type traffic.

12. The apparatus according to claim 10, wherein:
the first CoS type traffic includes Expedited Forwarding (EF) type traffic;
the second CoS type traffic includes Assured Forwarding (AF) type traffic; and the third CoS type traffic includes Default Forwarding (DF) type traffic.

13. An apparatus comprising:
at least two queue buffers configured to buffer data blocks of packet data units (PDUs) of at least two traffic flows in at least two queues for subsequent transmission to a logical output port having a port rate R1;
at least two schedulers, at least one of the at least two queues being assigned to each scheduler;
a main scheduling control configured to select, when ready to send another data block to said output port, one of said at least two schedulers having a highest priority and traffic to transmit;
the selected scheduler being configured to select a next queue to be serviced from among said at least one of the at least two queues assigned to the scheduler, and read a first data block of a next packet data unit waiting in said selected next queue;
a calculator configured to calculate a queue interval, for the first data block of said next packet data unit, based on a rate R1/N and a length of said next packet data unit, wherein N is an integer greater than 1, said queue interval representing the number of time slots to be skipped before next reading the data blocks from the queue after a present packet data unit; and
an overriding unit configured to randomly override said calculated queue interval with one of a predetermined shorter and a zero queue interval with a preset probability, to provide an effective intermediate queue rate between rate R1 and R1/N.

14. The apparatus according to claim 13, comprising:
a first queue configured for first Quality of Service (QoS) type traffic;
a second queue configured for second QoS type traffic and first Class of Service (CoS) type traffic;
a third queue configured for third QoS type traffic and second CoS type traffic;
a fourth queue configured for fourth QoS type traffic;
a fifth queue configured for fifth QoS type traffic and third CoS type traffic;
a first dynamic scheduler configured for the first and second queues;
a second dynamic scheduler configured for the third queue; and
a first-in-first-out (FIFO) scheduler configured for the fourth and fifth queues.

15. The apparatus according to 14, wherein:
the first QoS type traffic includes Constant Bit Rate (CBR) type traffic,
the second QoS type traffic includes Variable Bit Rate real-time (VBR-nrt) type traffic,
the third QoS type traffic includes Variable Bit Rate non-real-time (VBR-nrt) without tag type traffic,
the fourth QoS type traffic includes Variable Bit Rate non-real-time (VBR-nrt) with tag type traffic, and
the fifth QoS type traffic includes Unspecified Bit Rate (UBR) type traffic.

16. The apparatus according to claim 14, wherein
the first CoS type traffic includes Expedited Forwarding (EF) type traffic;
the second CoS type traffic includes Assured Forwarding (AF) type traffic; and
the third CoS type traffic includes Default Forwarding (DF) type traffic.

17. The apparatus according to claim 14, wherein the calculator is provided in at least one of said schedulers, said calculator further comprising:

a calculator configured to calculate a base interval based on a provisioned effective bandwidth for the effective intermediate queue rate versus the port rate; and
a bit shifting unit configured to calculate the queue interval based on the base interval and the packet data unit length.

18. The apparatus according to claim 17, comprising:
an overriding unit configured to randomly override said calculated queue interval with one of a predetermined shorter and a zero queue interval with a probability of 50%, to provide an effective intermediate queue rate between rate R1 and R1/N.

19. The apparatus according to claim 6, wherein the apparatus is included in a digital subscriber line access multiplexer.

20. A computer readable medium encoded with a computer program which, when executed by a processor, is perform a method comprising:
buffering data blocks of packet data units (PDUs) of a traffic flow in a queue for subsequent transmission to a logical output port having a port rate R1;
reading the data blocks of a packet data unit from said queue to a scheduler;
calculating a queue interval for the data blocks of said packet data unit based on a rate R1/N and a length of said packet data unit, wherein N is an integer equal to or greater than 1, said queue interval representing a number of time slots to be skipped before next reading data blocks from the queue after the present packet data unit; and
randomly overriding said calculated queue interval with one of a predetermined shorter and a zero queue interval with a preset probability to provide an effective intermediate queue rate between rate R1 and R1/N.

21. An apparatus comprising:
means for buffering data blocks of packet data units (PDUs) of a traffic flow in a queue for subsequent transmission to a logical output port having a port rate R1;
means for reading the data blocks of a packet data unit from said queue to a scheduler;
means for calculating a queue interval for the data blocks of said packet data unit based on a rate R1/N and a length of said packet data unit, wherein N is an integer greater than 1, said queue interval representing a number of time slots to be skipped before next reading data blocks from the queue after the present packet data unit; and
means for randomly overriding said calculated queue interval with one of a predetermined shorter and a zero queue interval with a preset probability, to provide an effective intermediate queue rate between rate R1 and R1/N.

22. An apparatus comprising:
a buffering unit configured to buffer data blocks of packet data units (PDUs) of a traffic flow in a queue for subsequent transmission to a logical output port having a port rate R1;
a reader configured to read a first data blocks of a packet data unit from said queue to a scheduler;
a calculator configured to calculate a queue interval for said first data blocks of said packet data unit based on a rate R1/N and a length of said packet data unit, wherein N is an integer greater than 1, said queue interval representing a number of time slots to be skipped before next reading data blocks from the queue after the present packet data unit; and
an overriding unit configured to randomly override said calculated queue interval with one of a predetermined shorter and a zero queue interval with a preset probability, to provide an effective intermediate queue rate between rate R1 and R1/N.

23. A computer readable medium encoded with a computer program which, when executed by a processor, is configured to perform a method comprising:

buffering data blocks of packet data units (PDUs) of a traffic flow in a queue for subsequent transmission to a logical output port having a port rate R1;

reading a first data block of a packet data unit from said queue to a scheduler;

determining a length of the packet data unit and calculating a queue interval for said first data block of said packet data unit based on a rate R1/N and the length of said packet data unit, wherein N is an integer greater than 1, said queue interval representing a number of time slots to be skipped before next reading data blocks from the queue after the present packet data unit; and randomly overriding said calculated queue interval with one of a predetermined shorter and a zero queue interval with a preset probability, to provide an effective intermediate queue rate between rate R1 and R1/N.

24. An apparatus comprising:

means for buffering data blocks of packet data units (PDUs) of a traffic flow in a queue for subsequent transmission to a logical output port having a port rate R1;

means for reading a first data block of a packet data unit from said queue to a scheduler;

means for determining a length of the packet data unit and calculating a queue interval for said first data block of said packet data unit based on a rate R1/N and the length of said packet data unit, wherein N is an integer greater than 1, said queue interval representing a number of time slots to be skipped before next reading data blocks from the queue after the present packet data unit; and means for randomly overriding said calculated queue interval with one of a predetermined shorter and a zero queue interval with a preset probability, to provide an effective intermediate queue rate between rate R1 and R1/N.

* * * * *